July 23, 1935. J. S. FONS 2,009,046
PIPE CLAMP
Filed April 20, 1933 2 Sheets-Sheet 2
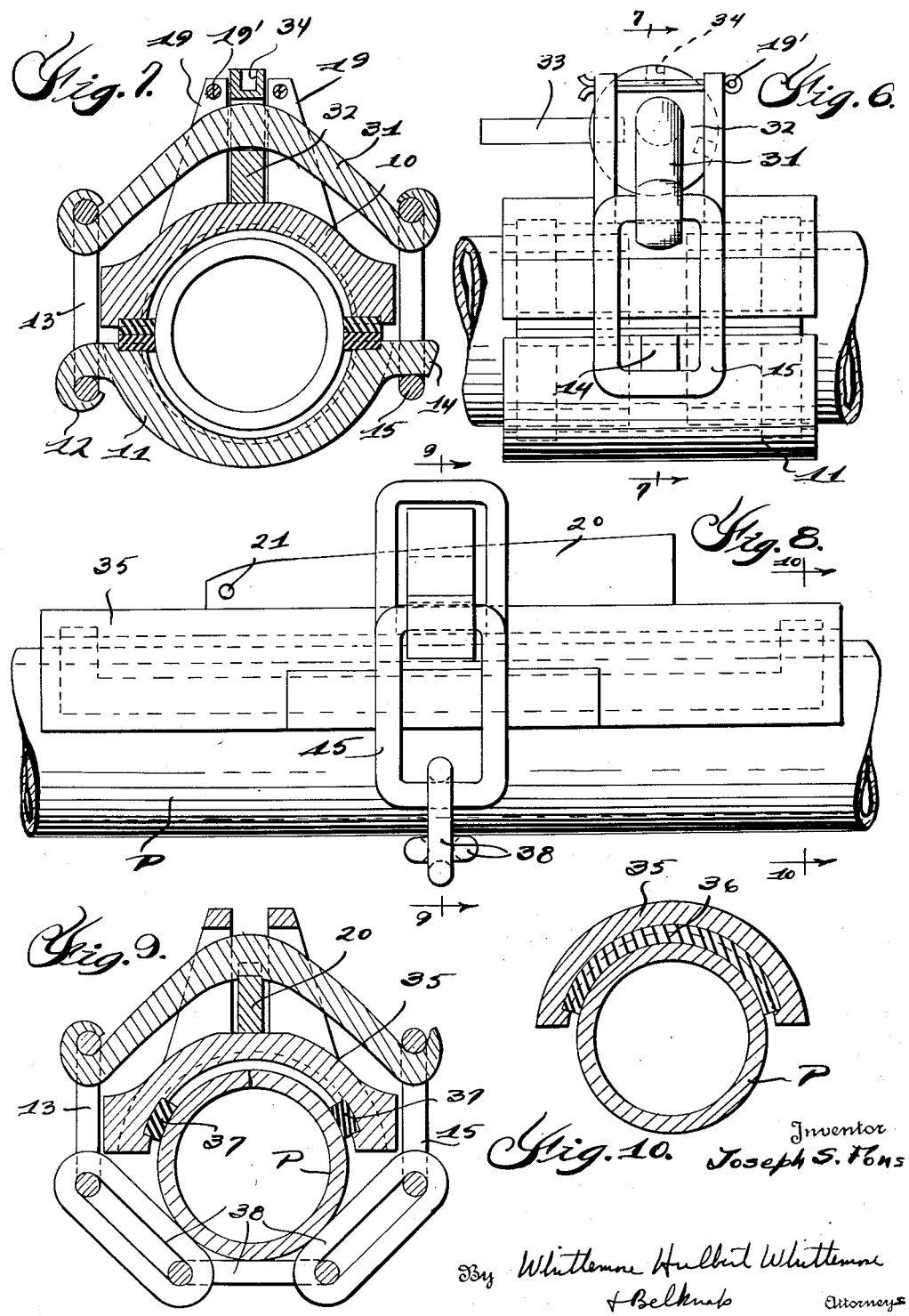

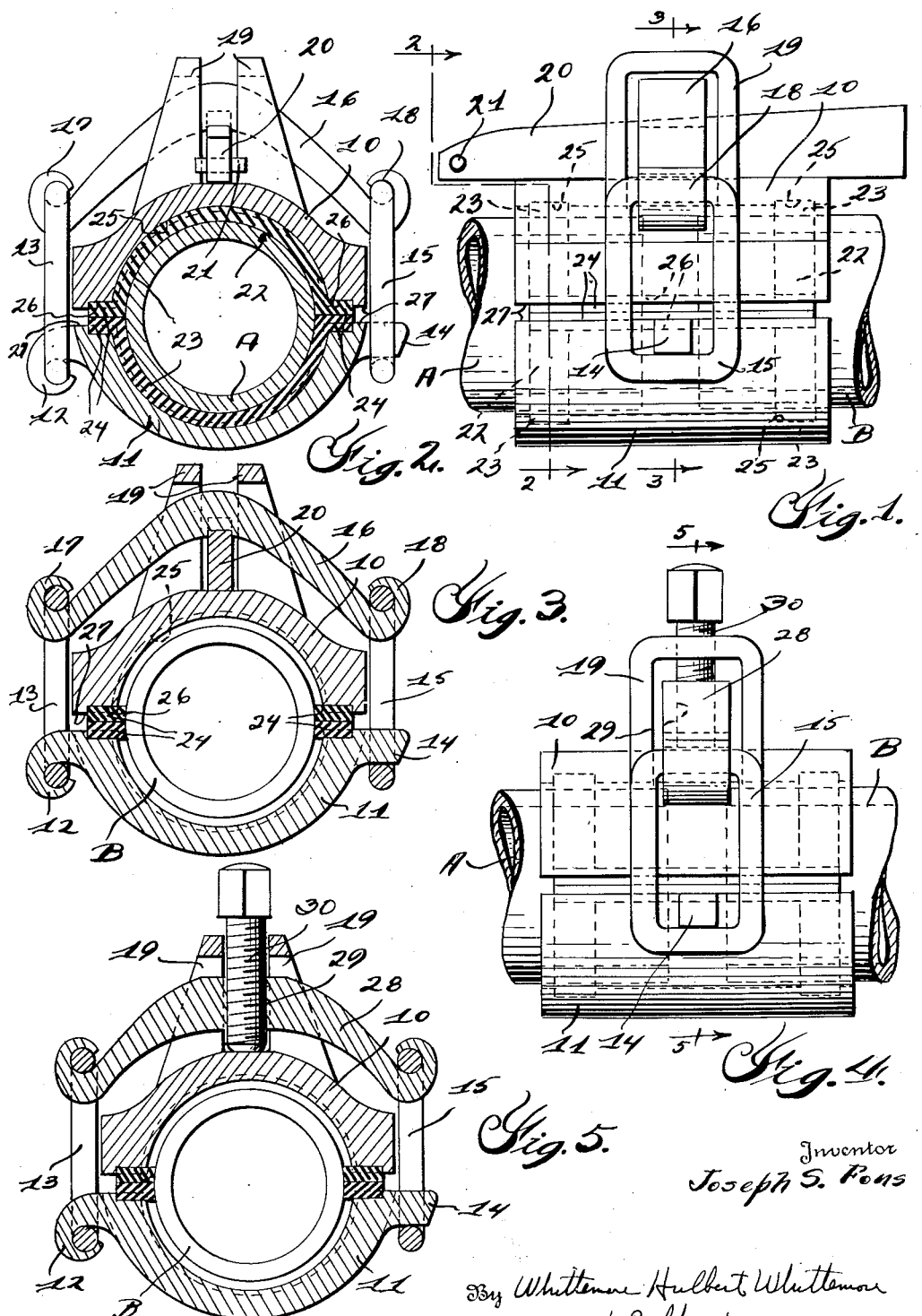

Patented July 23, 1935

2,009,046

UNITED STATES PATENT OFFICE 2,009,046

PIPE CLAMP

Joseph S. Fons, Royal Oak, Mich.

Application April 20, 1933, Serial No. 667,009

12 Claims. (Cl. 24—19)

This invention relates to pipe clamps or coupling devices and has as its objects to simplify, render more efficient, and improve generally devices of this character.

One of the objects of this invention is to provide a clamping device adapted for use in coupling together the adjacent ends of two pipes, or for sealing a leak in a pipe.

Another object of the invention is to provide a device of this general character which will be relatively light in weight and may be quickly and economically manufactured, and easily assembled and applied.

The several objects, advantages and novel details of the invention will be made more apparent as this description proceeds, especially when considered in connection with the accompanying drawings, wherein Figure 1 is a side elevational view of a coupling device constructed in accordance with this invention;

Figure 2 is a sectional elevational view taken substantially on the plane indicated by line 2—2 in Figure 1;

Figure 3 is a transverse sectional view taken substantially on the plane indicated by line 3—3 in Figure 1;

Figure 4 is a view similar to Figure 1 showing a modified form of construction;

Figure 5 is a transverse sectional view taken substantially on the plane indicated by line 5—5 in Figure 4;

Fgure 6 is a view similar to Figure 1 of another modified form of construction;

Figure 7 is a transverse sectional view taken substantially on the plane indicated by line 7—7 in Figure 6;

Figure 8 is a side elevational view of my improved clamping device when employed as a leak repair cover;

Figure 9 is a transverse sectional view taken substantially on the plane indicated by line 9—9 in Figure 8, and Figure 10 is a transverse sectional view taken on the plane indicated by line 10—10 in Figure 8.

Referring now more especially to Figures 1 to 3 inclusive wherein the first form of construction is illustrated, it will be noted that in this form of construction the clamp is employed for coupling together the adjacent ends of pipes A and B. The clamp or coupling device consists of a pair of semi-tubular segmental clamping sections 10 and 11 constituting the upper and lower sections respectively of the clamp.

The lower clamping section 11 is provided preferably centrally at one longitudinal edge thereof with a curled ear or projection 12 forming a pivot recess or support in which a link 13 is pivotally mounted. Diametrically opposite thereto the other longitudinal edge of the section 11 is provided with a projection or lug 14 under which a link 15 is adapted to engage.

The reference character 16 indicates a saddle member which is pivotally connected to the link 13 as at 17 and pivotally connected to the link 15 as at 18.

The saddle 16 extends through a pair of spaced loop-shaped lugs 19 projecting upwardly from the upper section 10 and is adapted to be engaged on its underside and intermediate its ends by means of a tapered key or wedge-shaped member 20 extended longitudinally of the clamping sections 10—11 and longitudinally of the pipes A and B. This key or wedge-shaped member is slidable in the space between the loop-shaped lugs 19 which will obviously act as lateral guides for this key. When the key or wedge 20 is forced into operative position its upper longitudinal edge engages the underside of the saddle 16, whereas the lower longitudinal edge thereof will engage the adjacent upper surface of the clamping section 10 to thus clamp the sections together, as will be obvious.

The wedge member 20 is provided adjacent its narrow end thereof with a transversely extending pin or the like 21 providing lateral projections which engage the loop-shaped lugs 19 to prevent the complete removal of the wedge member 20 during the inoperative condition of the clamping device.

For the purpose of providing a seal between the pipe sections A and B and the clamping sections 10 and 11, each of the sections 10 and 11 is provided with a gasket or packing member 22. Each of these packing members is preferably provided with spaced semi-circular portions 23 connected by longitudinally extending portions 24 at the ends thereof. The semi-circular portions 23 of each packing member are seated in similarly shaped recesses 25 adjacent the ends of the clamping sections whereas the longitudinally extending portions 24 are seated in recesses 26 in the longitudinal shoulders or faces 27 of the sections. These gasket receiving recesses are shallow so that the gaskets project beyond the face of the clamping sections, as will be most apparent probably from Figure 2. The semi-circular portions 23 at the ends together encircle the pipe sections, whereas the longitudinal portions 24 of the gaskets or packing members engage one another. These gasket or packing members are preferably formed of some flexible material such as rubber or rubber composition and are thus compressible to permit relative angular movement between the pipe sections A and B as will be apparent.

In Figures 4 and 5, a slightly modified form of construction is illustrated which in many respects is similar to the form of construction just described. However, in this modified form of construction the saddle member 28 is provided intermediate its ends with a threaded aperture 29 with which a set screw 30 engages. The looped lugs 19, previously referred to, are spaced apart a sufficient distance to accommodate the set screw 30.

When the set screw is threaded through the saddle 28 its lower end engages the adjacent surface of the upper clamping section 10 and cooperates with the saddle 28 and the links 13 and 15 to clamp the sections together.

In both forms of construction heretofore described, it will be understood that the clamping sections 10 and 11 are engaged with the pipe ends whereupon the pivoted link 15 will be engaged with the lug 14 and thereafter the clamping element either in the form of the wedge-shaped member or key 20 or set screw 30 will be operated to tightly clamp the sections 10 and 11 into engagement with the pipe ends.

In the modified form of construction shown in Figures 6 and 7, a slightly different form of clamping means is illustrated. In this modified form, the saddle member 31 has rotatably mounted thereon a cam member 32, this cam member working between the lugs 19, the upper ends of which are connected by cotter pins 19'. The opening in the cam member through which the saddle member is threaded may be slightly enlarged so as to facilitate the threading of the saddle members through the cam members. When the cam member is rotated to bring its cam surface into engagement with the upper clamping section 10, the sections will be clamped together in the same manner as hereinbefore described. For the purpose of rotating the cam member 32, a projection or lever 33 may be provided, or the periphery of the cam member may be provided with spaced recesses 34 engageable by a rod or the like.

In Figures 8, 9 and 10 the invention is illustrated as it would be constructed when used as a leak repair cover. Under these conditions, a segmental cover member 35 would be substituted for the upper segmental section 10 heretofore referred to. If desired, the cover member 35 may be made longer than the clamping section 10 and the section 35 has been thus illustrated in Figure 8. The cover section 35 would be provided with a shallow recess to receive a gasket member similar to the packing member heretofore referred to which would consist of semi-circular end portions 36 joined by longitudinally extending portions 37. This cover member 35 might also be lined with rubber or similar material, if desired.

While it is practical to merely substitute the cover member 35 for the upper section 10, it has also been found that the lower section 11 may be eliminated and the links 13 and 15 united by additional links 38 which will engage the underside of the pipe P. These links, of course, will take the place of the lower section 11 and cooperate to hold the cover section 35 in tight engagement with the pipe. In this form of construction, a tapered key or wedge member 20 identical with that illustrated in Figures 1 to 3 inclusive, will be employed, and in other respects the device will be the same as that of the first form of construction described. Where long cover sections 35 are employed, two saddles, two sets of loop-shaped lugs 19, and two wedge-shaped members 20 and the other accompanying structure may be provided spaced longitudinally of the cover member 35.

With all of the forms of construction hereinbefore described, it will be apparent that the sections of the clamp may be quickly and easily applied and the construction is such that portions of the device projecting a major distance beyond the pipe at the sides thereof are eliminated. Moreover, the construction may be made light in weight and may be quickly and economically manufactured and easily assembled.

While several embodiments of the invention have been illustrated herein somewhat in detail, it will be immediately apparent to those skilled in this art that various changes in many of the nonessential details of construction may be resorted to without departing from the spirit and scope of this invention, and to this end reservation is made to make such changes as may come within the purview of the accompanying claims.

What I claim as my invention is:

1. In a device of the class described, a pair of clamping sections engaging opposite sides of a pipe, means for providing a sealed space between said clamping sections and pipe, a saddle member, means for connecting said saddle member to one of said clamping sections, and a wedge-like member engageable between said saddle member and the other of said clamping sections for forcing said clamping section into engagement with the pipe.

2. In a device of the class described, a pair of clamping sections engaging opposite sides of a pipe, means for providing a sealed space between said clamping sections and pipe, a transversely extending saddle member arranged above one of said clamping sections and connected at its ends to the other clamping section, and a longitudinally extending wedge-like member arranged between said saddle member and said first mentioned clamping section for forcing said clamping sections into engagement with the pipe.

3. In a device of the class described, upper and lower clamping sections arranged on opposite sides of a pipe, a pair of spaced looped lugs extending upwardly from the upper clamping section, a saddle member extending through the loops of said lugs and connected at its ends to the lower clamping section, and means located in the space between said lugs and engageable with said saddle member and the upper clamping section for forcing said clamping sections into engagement with the pipe.

4. In a device of the class described, upper and lower clamping sections arranged on opposite sides of a pipe, a pair of spaced looped lugs extending upwardly from the upper clamping section, a saddle member extending through the loops of said lugs and connected at its ends to the lower clamping section, and a tapered key extending longitudinally of the pipe in the space between said lugs and engaging the upper clamping section and said saddle member for forcing said clamping sections into engagement with the pipe.

5. In a device of the class described, upper and lower clamping sections engaging opposite sides of a pipe, a transversely extending saddle member pivotally connected at one end to the lower clamping section and detachably connected at its other end to said lower clamping section, and means engageable with said saddle member and the upper clamping section for forcing said clamping sections into engagement with the pipe.

6. In a device of the class described, upper and lower clamping sections arranged on opposite sides of a pipe, a pair of spaced looped lugs extending upwardly from the upper clamping section, a saddle member extending through the loops of said lugs and connected at its ends to the lower clamping section, and a cam member located in the space between the lugs and rotatably journaled on said saddle member for forcing said clamping sections into engagement with the pipe.

7. In a device of the class described, upper and lower clamping sections arranged upon opposite sides of the pipe, a saddle member extending transversely of the axis of the pipe and connected at its ends to said lower clamping section, a wedge-like member engaging said saddle member and said upper clamping section for forcing said clamping sections in a direction to engage the pipe, and means for providing a sealed space between the clamping sections and the pipe.

8. In a device of the class described, upper and lower semi-tubular segmental clamping sections arranged on opposite sides of a pipe, a pair of spaced looped lugs extending upwardly from the upper clamping section, a saddle member extending through the loops of said lugs and pivotally connected at one end to the lower clamping section and detachably connected at its other end to said lower clamping section, a wedge-like member extending longitudinally of the pipe and located in the space between said lugs and engaging the upper clamping section and saddle member for forcing said clamping sections in a direction to engage the pipe, and means for providing a sealed space between the clamping sections and the pipe.

9. In a device of the class described, a clamping section engageable with a pipe, means for providing a sealed space between said clamping section and the pipe, cooperating means engageable with the opposite side of the pipe, a saddle member connected at its ends to said cooperating means, and means acting on said saddle member for forcing said clamping section into engagement with the pipe.

10. In a device of the class described, a clamping section engageable with a pipe, a pair of spaced looped lugs projecting from the clamping section, cooperating means engageable with the opposite side of the pipe, a saddle member extending through the loops of said lugs and connected to said cooperating means, and means located in the space between said lugs and engageable with said saddle member and said clamping section for forcing the latter into engagement with the pipe.

11. In a device of the class described, a pair of clamping sections engaging opposite sides of a pipe, means for providing a sealed space between the clamping sections and the pipe, a saddle member connected at its ends to one of said clamping sections, and means acting on said saddle member and the other of said clamping sections for forcing said clamping sections into engagement with the pipe.

12. In a device of the class described, a pair of clamping sections arranged on opposite sides of a pipe, a pair of spaced looped lugs projecting from one of said clamping sections, a saddle member extending through the loops of said lugs and connected at its ends to the other clamping section, and a set screw located in the space between the lugs and threadedly engaging said saddle member for adjustably engaging the clamping section to force said clamping sections into engagement with the pipe.

JOSEPH S. FONS.